(12) United States Patent
Reponen et al.

(10) Patent No.: US 9,223,343 B2
(45) Date of Patent: Dec. 29, 2015

(54) APPARATUS, METHOD AND COMPUTER PROGRAM

(75) Inventors: Erika Reponen, Tampere (FI); Mikko Nurmi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 667 days.

(21) Appl. No.: 13/167,094

(22) Filed: Jun. 23, 2011

(65) Prior Publication Data

US 2012/0326853 A1    Dec. 27, 2012

(51) Int. Cl.
| | |
|---|---|
| *G08B 6/00* | (2006.01) |
| *G06F 1/16* | (2006.01) |
| *G06F 3/01* | (2006.01) |
| *G06F 3/0483* | (2013.01) |
| *G06F 3/0484* | (2013.01) |
| *H04M 1/02* | (2006.01) |

(52) U.S. Cl.
CPC ............ *G06F 1/1626* (2013.01); *G06F 1/1652* (2013.01); *G06F 3/016* (2013.01); *G06F 3/017* (2013.01); *G06F 3/0483* (2013.01); *G06F 3/04842* (2013.01); *G06F 2203/04102* (2013.01); *H04M 1/0202* (2013.01)

(58) Field of Classification Search
CPC ................ G06F 2203/04102; G06F 2203/014; G06F 2203/04808; G06F 1/1626; G06F 1/1652; G06F 3/016; G08B 6/00; G08B 21/24; H04M 1/0202
USPC ........ 340/539.11, 384.7, 407.1, 7.6; 345/156, 345/173, 174, 179; 455/412.2, 566, 567, 455/90.3
See application file for complete search history.

(56) References Cited

U.S. PATENT DOCUMENTS

| | | | |
|---|---|---|---|
| 7,292,227 B2* | 11/2007 | Fukumoto et al. ............ 345/173 |
| 7,648,236 B1 | 1/2010 | Dobson | |
| 8,306,576 B2* | 11/2012 | Cho et al. ...................... 455/567 |
| 8,316,166 B2* | 11/2012 | Grant et al. ..................... 710/73 |
| 8,502,788 B2* | 8/2013 | Cho .............................. 345/173 |
| 2004/0008191 A1 | 1/2004 | Poupyrev et al. | |
| 2007/0146339 A1 | 6/2007 | Yang et al. | |
| 2009/0088220 A1 | 4/2009 | Persson | |
| 2009/0184808 A1* | 7/2009 | Kim ........................... 340/407.1 |
| 2009/0325647 A1 | 12/2009 | Cho et al. | |
| 2010/0056223 A1 | 3/2010 | Choi et al. | |
| 2010/0162109 A1 | 6/2010 | Chatterjee et al. | |
| 2011/0025480 A1* | 2/2011 | Hwang et al. ............. 340/407.1 |

FOREIGN PATENT DOCUMENTS

| | | |
|---|---|---|
| WO | WO 2007/060243 A1 | 5/2007 |
| WO | WO 2011/107195 A1 | 9/2011 |

OTHER PUBLICATIONS

International Search Report and Written Opinion for Application No. PCT/IB2012/053153 dated Dec. 6, 2012.

* cited by examiner

*Primary Examiner* — Hung T Nguyen
(74) *Attorney, Agent, or Firm* — Alston & Bird LLP (57) ABSTRACT

A method, apparatus and computer program wherein the method comprises detecting that a designated item satisfies a predetermined context; and providing tactile indication that the designated item satisfies the predetermined context.

20 Claims, 5 Drawing Sheets

APPARATUS, METHOD AND COMPUTER PROGRAM

TECHNOLOGICAL FIELD

Embodiments of the present invention relate to an apparatus, method and computer program. In particular, they relate to an apparatus, method and computer program which enable a user to access information.

BACKGROUND

Apparatus that enable a user to access information are known. The information may be stored in the apparatus or it may be accessed by the apparatus via a communication link. Where a large amount of information is available to a user it is useful to enable a user to differentiate between the different items of information available. This may enable the user to easily access the items of information they need or want.

BRIEF SUMMARY

According to various, but not necessarily all, embodiments of the invention there is provided a method comprising: detecting that a designated item satisfies a predetermined context; and providing tactile indication that the designated item satisfies the predetermined context.

In some embodiments of the invention the predetermined context may comprise displaying the designated item on a display.

In some embodiments of the invention the predetermined context may comprise the designated item being within a predetermined distance of a user.

In some embodiments of the invention the tactile indication may comprise the physical deformation of a portion of an apparatus. The tactile indication may comprise folding a portion of the apparatus.

In some embodiments of the invention the designated item may be designated in response to a user physically deforming at least a portion of the apparatus. The designated item may be designated in response to a user folding a portion of the apparatus.

In some embodiments of the invention the designated item may comprise an item associated with a function of the apparatus. The designated item may comprise an item from a service to which the user of the apparatus subscribes. The designated item may be designated by one or more other users of the service.

In some embodiments of the invention the designated item may comprise a real world item.

In some embodiments of the invention the designated item may be designated by the user of the apparatus.

In some embodiments of the invention the type of tactile indication provided may depend upon properties of the designated item.

In some embodiments of the invention the properties of the designated item may comprise a level of importance assigned to the item. The properties of the designated item may comprise the number of different users which have designated the item.

In some embodiments of the invention the method may further comprise detecting that the designated item no longer satisfies the predetermined context and removing the tactile indication.

In some embodiments of the invention the tactile indication may be provided automatically whenever the designated item satisfies the predetermined context.

According to various, but not necessarily all, embodiments of the invention there is also provided an apparatus comprising: at least one processor; and at least one memory including computer program code; wherein the at least one memory and the computer program code are configured to, with the at least one processor, enable the apparatus to: detect that a designated item satisfies a predetermined context; and provide tactile indication that the designated item satisfies the predetermined context.

In some embodiments of the invention the predetermined context may comprise displaying the designated item on a display.

In some embodiments of the invention the predetermined context may comprise the designated item being within a predetermined distance of the apparatus.

In some embodiments of the invention the tactile indication may comprise the physical deformation of a portion of the apparatus. The tactile indication may comprise folding a portion of the apparatus.

In some embodiments of the invention the designated item may be designated in response to a user physically deforming at least a portion of the apparatus.

In some embodiments of the invention the designated item may be designated in response to a user folding a portion of the apparatus.

In some embodiments of the invention the designated item may comprise an item associated with a function of the apparatus.

In some embodiments of the invention the designated item may comprise an item from a service to which the user of the apparatus subscribes. In some embodiments of the invention the designated item may be designated by one or more other users of the service.

In some embodiments of the invention the designated item may comprise a real world item.

In some embodiments of the invention the designated item may be designated by the user of the apparatus.

In some embodiments of the invention the type of tactile indication provided may depend upon properties of the designated item. The properties of the designated item may comprise a level of importance assigned to the item.

In some embodiments of the invention the properties of the designated item may comprise the number of different users which have designated the item.

In some embodiments of the invention the at least one memory and the computer program code may also be configured to, with the at least one processor, enable the apparatus to detect that the designated item is no longer displayed on the display and remove the tactile indication.

In some embodiments of the invention the at least one memory and the computer program code may also be configured to, with the at least one processor, enable the apparatus to automatically provide the tactile indication whenever the designated item is displayed on the display.

According to various, but not necessarily all, embodiments of the invention there is also provided a computer program comprising computer program instructions that, when executed by at least one processor, enable an apparatus at least to perform: detecting that a designated item is displayed on a display; and providing tactile indication that the designated item is displayed on the display.

In some embodiments of the invention the computer program may comprise program instructions for causing a computer to perform the method of any of above paragraphs.

In some embodiments of the invention there may be provided a physical entity embodying the computer program as described above.

In some embodiments of the invention there may be provided an electromagnetic carrier signal carrying the computer program as described above.

The apparatus may be for wireless communication.

BRIEF DESCRIPTION

For a better understanding of various examples of embodiments of the present invention reference will now be made by way of example only to the accompanying drawings in which.

DETAILED DESCRIPTION

The Figures illustrate a method comprising: detecting 37 that a designated item satisfies a predetermined criteria; and providing 43 tactile indication 55 that the designated item satisfies the predetermined criteria.

Figure 1:
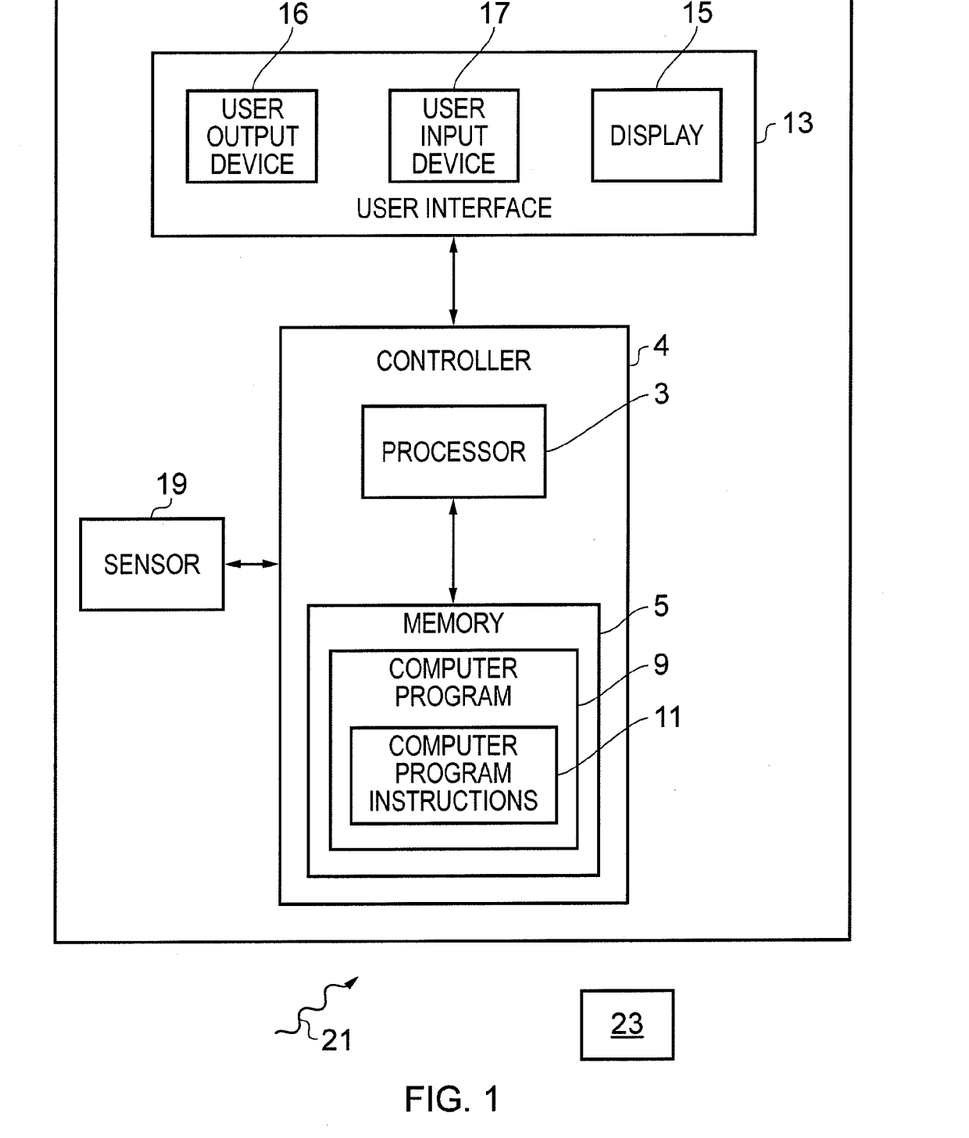
FIG. 1 schematically illustrates an apparatus according to an exemplary embodiment of the invention.

FIG. 1 schematically illustrates an apparatus 1 according to an exemplary embodiment of the invention. The apparatus 1 may be an electronic apparatus. The apparatus 1 may be, for example, a mobile cellular telephone, a personal computer, a camera, a gaming device, a personal digital assistant, an electronic book reader, a personal music player, a headset or headphones or any other similar apparatus. The apparatus 1 may be a handheld apparatus 1 which can be carried in a user's hand, handbag or jacket pocket for example. In some embodiments of the invention the apparatus may comprise a wearable apparatus such as a wearable display.

Only features referred to in the following description are illustrated in FIG. 1. However, it should be appreciated that the apparatus 1 may comprise additional features that are not illustrated. For example, in embodiments of the invention where the apparatus 1 is a mobile cellular telephone or other communications device, the apparatus 1 may also comprise a transmitter and receiver configured to enable wireless communication.

The apparatus 1 illustrated in FIG. 1 comprises: a user interface 13 and a controller 4. In the illustrated embodiment the controller 4 comprises at least one processor 3 and at least one memory 5 and the user interface 13 comprises a display 15, a user input device 17 and a user output device 16. In some exemplary embodiments the apparatus 1 may also comprise one or more sensors 19 which may be configured to detect physical deformation of the apparatus 1.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet.

The controller 4 may also be configured to enable the apparatus 1 to detect 37 (see FIG. 3B) that a designated item satisfies a predetermined criteria; and provide 43 (see FIG. 3C) tactile indication that the designated item satisfies the predetermined criteria.

The at least one processor 3 is configured to receive input commands from the user interface 13 and also to provide output commands to the user interface 13. The at least one processor 3 is also configured to write to and read from the at least one memory 5. The outputs of the user interface 13 are provided as inputs to the controller 4.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIGS. 3A to 3C. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for detecting that a designated item satisfies a predetermined criteria; and means for providing tactile indication that the designated item satisfies a predetermined criteria.

In relation to FIG. 1, the computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code 9. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In the exemplary embodiment illustrated in FIG. 1 the user interface 13 comprises a user input device 17, a user output device 16 and a display 15.

The user input device 17 may comprise any means which enables a user of the apparatus 1 to input information into the apparatus 1. The information may be used to control the apparatus 1. The information may be stored in the one or more memories 5 of the apparatus 1. The user input device 17 may comprise a touch sensitive display, a flexible display, a keypad or a combination of a number of different types of user input devices. The device may comprise various processors, transmitters and receivers and protocol capabilities. For example, the device may have Wi-Fi, 802.11a/b/g/n/x, Bluetooth, Infra-red, Worldwide interoperability for microwave access (WiMax), Global positioning system (GPS) and Universal serial bus (USB) capabilities.

The display 15 may comprise any means which enables information to be displayed to a user of the apparatus 1. The information may correspond to information which has been input by the user via the user input device 17, information which is stored in the one or more memories 5 or information which has been received by apparatus 1.

In some embodiments of the invention the user input device 17 and the display 15 may be combined to provide a touch sensitive display which both enables information to be displayed to a user and enables a user to make user inputs.

The user output device 16 may comprise any means for providing an output to the user of the apparatus 1. The output may comprise a tactile indication 55, as illustrated in FIGS. 4A-4D. The tactile indication 55 may be any output provided by the apparatus 1 which the user of the apparatus 1 may sense through touch.

In some embodiments of the invention the user output device 16 may be configured to provide a tactile indication 55 by physically deforming the apparatus 1 or a portion of the apparatus 1. For example, the tactile indication 55 may comprise the folding of a corner or edge potion of the apparatus 1 or any other contortion or deformation of the apparatus 1 which may be felt by the user of the apparatus 1.

In such embodiments of the invention the apparatus 1 may comprise a flexible body portion which may be bent or folded by the user of the apparatus 1. The controller 4 may also be configured to control the flexible body portion so that the apparatus may be bent or folded automatically without any direct input from the user of the apparatus 1.

The flexible body portion may comprise a resiliently deformable material that surrounds an inner protective core. The inner protective core may house the controller and other components that may be damaged if bent or deformed. The resiliently deformable material may comprise, for example, a gel or fluid in a sealed sac and/or elastomeric material. The controller 4 may be configured to control the shape of the flexible body portion by providing an electrical signal to resilient deformable material to cause a change in shape of the deformable material.

In some embodiments the apparatus 1 may comprise a plurality of hinged or jointed segments. The hinged or jointed segments may be configured to be moved with respect to each other to enable a portion of the apparatus 1 to be folded or bent. The apparatus 1 may be folded or bent in response to a force applied by the user of the apparatus 1 or an electrical signal provided by the controller 4.

In some embodiments of the invention the tactile indication 55 may comprise a change in stiffness of the apparatus 1. For example the apparatus 1 may be configured to switch between being stiff and rigid, so that a user cannot bend or deform the apparatus 1, and flexible so that the user can bend or deform the apparatus 1.

In other embodiments of the invention the tactile indication 55 may comprise a raised portion or an indented portion of the outer surface of the apparatus 1 or a change in the texture of the surface of part of the apparatus 1. In such embodiments of the invention the apparatus 1 may comprise a flexible outer surface layer which overlays a deformable layer. The deformable layer may be positioned underneath the flexible outer surface layer of the apparatus 1 so that any change in the topology of the deformable layer causes a corresponding change in the topology of the flexible outer surface layer.

The deformable layer, may comprise, for example a layer of electroactive polymer (EAP) or any other material which changes shape when a voltage is applied to it. The deformable layer may be configured to provide localized changes in the shape of the outer surface of the apparatus 1. For example the deformable layer may be configured to provide deformations such as projections and indentations in the surface of the apparatus 1 which the user of the apparatus 1 can feel with their hand or fingers.

The deformable layer may be controlled by the controller 4. For example, the controller 4 may control the voltage applied across an EAP layer and so control the deformations provided by the deformable layer.

In other embodiments of the invention the tactile indication 55 may comprise an electrical impulse which is provided to the user rather than a physical deformation of the apparatus 1. For example, a current may be provided to the surface of the apparatus 1 to change the electrical charge of the surface of the apparatus 1. The user may be able to sense this through their skin and so be provided with a tactile indication 55.

As mentioned above, in some embodiments of the invention the apparatus 1 may also comprise one or more sensors 19. The sensors 19 may be configured to detect contortions and other deformations of the apparatus 1 by a user. The sensors 19 may be configured to detect different contortions and deformations and provide an output signal to the controller 4 which enables the controller 4 to determine between the different contortions and deformations. The controller 4 may then control the apparatus 1 in dependence upon the detected deformation.

Figure 2:
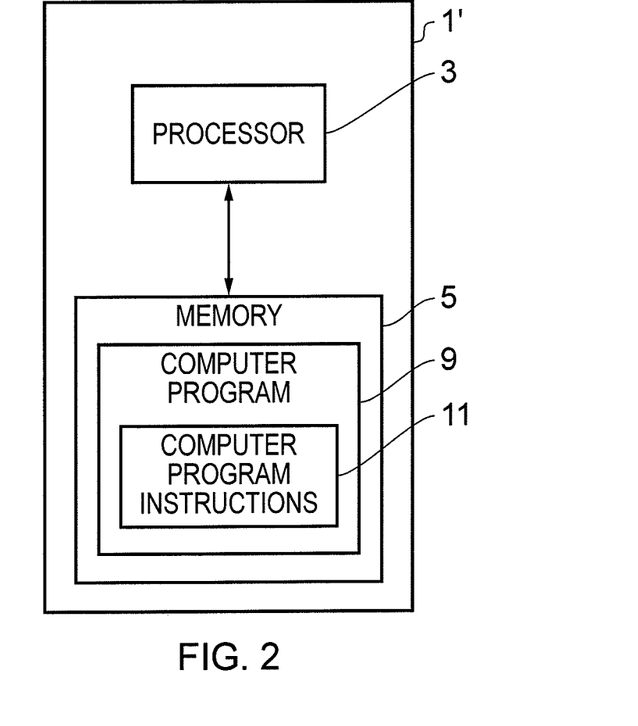
FIG. 2 schematically illustrates another apparatus according to an exemplary embodiment of the invention.

FIG. 2 illustrates an apparatus 1' according to another embodiment of the invention. The apparatus 1' illustrated in FIG. 2 may be a chip or a chip-set. The apparatus 1' comprises at least one processor 3 and at least one memory 5 as described above in relation to FIG. 1.

Figure 3A:
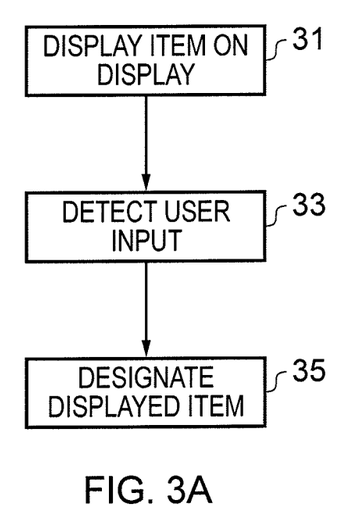
FIGS. 3A to 3C are block diagrams which schematically illustrate a method according to an exemplary embodiment of the invention.
Figure 3B:
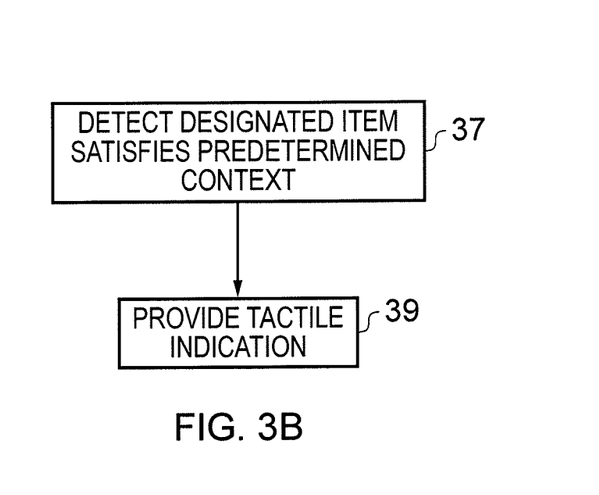
Figure 3C:
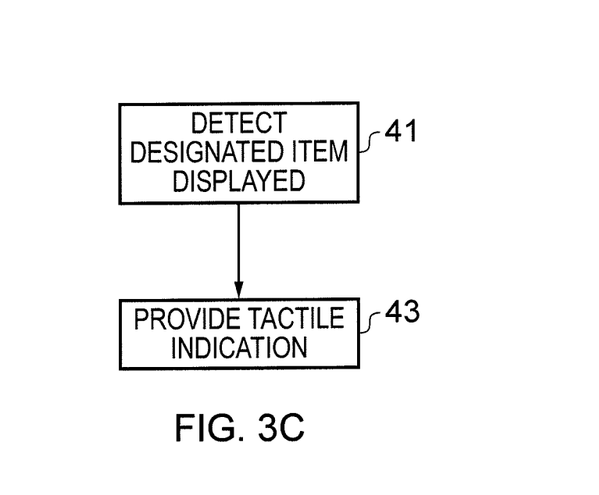

FIGS. 3A and 3C are block diagrams which schematically illustrate methods according to exemplary embodiments of the invention.

FIG. 3A illustrates a method of designating an item according to embodiments of the invention. At block 31 an item is displayed on the display 15. The item may comprise any item of information which may be displayed on the display 15.

In some embodiments of the invention the item may be associated with a particular function of the apparatus 1. The information may be stored in the one or more memories of the apparatus 1. For example the item may comprise information which is associated with an application such as a contacts list or phone book application which enables a user to enter and store information relating to their contacts. In such examples, the item which is displayed on the display 15 may comprise the contact details of a contact of the user.

In some embodiments of the invention the item may comprise information which has been received or accessed by the apparatus 1. In such embodiments of the invention the information may be stored externally to the apparatus 1. For example, it may be stored in an external server which the apparatus 1 can access via a communications link. The communications link may comprise a wired or wireless connection. For instance, the information may comprise a web page which the apparatus 1 can access via an internet connection.

In some embodiments of the invention the item may relate to a service to which the apparatus 1 or the user of the apparatus 1 is a subscriber. For example the user of the apparatus 1 may be registered with a networking or communication service which may enable a user to access information. This information may be accessed via a communications link.

In other embodiments of the invention the item may comprise a message such as an email message a short message service (SMS) message or an instant messaging message which has been received by the apparatus 1. Once the information has been received by the apparatus 1 it may be stored in the one or more memories 5 of the apparatus 1.

The information may comprise a portion of a document such as an electronic book. The document may contain more information than can be displayed on the display 15 simultaneously. For example an electronic book may contain several hundred or several thousand pages. Each page may be displayed on the display 15 individually. A user may be able to scroll through the documents to enable the respective pages to be displayed on the display 15. It is to be appreciated that other types of information may be displayed in other embodiments of the invention.

At block 33 of FIG. 3A the controller 4 detects that the user has made a user input designating the item of information which is currently displayed on the display 15. A user may wish to designate an item of information to distinguish the item from the other items of information which are available. For example, where the information comprises a webpage the user may wish to designate the webpage as a favorite webpage so that they can easily return to that page. Similarly if the item comprises a particular section of a document such as an electronic book the user may wish to easily find the section of the electronic book again.

In some embodiments of the invention the user may wish to designate the information to indicate a level of importance or significance to the information. For example, if a webpage or message contains an important piece of information then the user may wish to designate the information as high importance. A user may be able to designate a message as high importance before the message is sent so that the recipient of the message may see that it is considered to be high importance by the sender. Alternatively the receiver of the message may be able to designate the message as high importance, if for example, the message contains some instructions or information which they need to return to.

In some embodiments of the invention the user input which is detected at block 33 may comprise physically deforming the apparatus 1. For example, in some embodiments of the invention where the apparatus 1 comprises a flexible portion the user input may comprise folding over a corner or an edge portion of the apparatus 1. This action may replicate the action of bookmarking the page of a physical book by turning down the corner of a page. In such embodiments of the invention the sensors 19, may be configured to sense the deformation of the apparatus 1. It is to be appreciated that any suitable means may be used to detect the deformation of the apparatus 1.

In other embodiments of the invention the user input may comprise a user action which merely mimics the actions of turning down the corner of a physical page. For example, in embodiments of the invention where the user interface 13 comprises a touch sensitive display 15 the user input may comprise a trace input which starts in a corner of the touch sensitive display 15 and moves inwards in a generally diagonal direction. This action may be similar to the action of physically turning the corner of a page in a book but might not actually cause the physical deformation of the apparatus 1.

In some embodiments of the invention the user may designate an item by making a user input via a user input device 17 such as a touch sensitive display as described above. In such embodiments of the invention a tactile indication may be provided once the user has made the input designating the item. This may enable a user to easily recognize the tactile indication associated with the item.

It is to be appreciated that in other embodiments of the invention other types of user input may be used instead of, or in addition to, the user input described above.

At block 35 of FIG. 3A, in response to the user input, the controller 4 marks the item which is displayed on the display 15 as designated. Once the item is designated it may be listed in a list of designated items. For example a user may have a list of favorite web pages which enables a user to easily access the listed web pages.

Once the item is marked as designated it may be associated with a tactile indication so that whenever the designated item is displayed on the display 15 the associated tactile indication is provided simultaneously. In some embodiments of the invention the designated item may also be associated with a graphical user interface item, which may be displayed whenever the designated item is displayed on the display 15.

FIG. 3B illustrates a method of detecting that a designated item satisfies a predetermined context according to embodiments of the invention. The method of FIG. 3B may be carried out by the same apparatus 1 as the method described above in relation to FIG. 3A. Alternatively in other embodiments of the invention the methods may be carried out by two different apparatus.

At block 37 the controller 4 detects that the designated item satisfies a predetermined context. The designated item may have been designated using the method described above.

The predetermined context may comprise a set of conditions which the designated item satisfies. The conditions may comprise conditions relating to to the status of the designated item, for example, the predetermined context may be that a designated item is displayed on the display 15, as described below. In some embodiments of the invention the condition could be whether or not the user has read or accessed the information. For example, where the designated item comprises information which has been received by the apparatus 1, such as a message, the predetermined context could be that the message has not been opened or read.

In other embodiments of the invention the predetermined context may comprise the condition that a real world item satisfies a physical condition. For example, in some embodiments of the invention the designated item may comprise a place or a user. In such embodiments of the invention the predetermined context may comprise the condition that the designated place or user is within a predetermined distance of the apparatus 1.

The predetermined context may be defined by the user of the apparatus 1. In some embodiments of the invention the predetermined context may be defined by the user who designates the item.

In response to the detection that the designated item satisfies a predetermined context the controller 4 controls the user output device 16, at block 39, to provide a tactile indication 55 to the user of the apparatus 1. The tactile indication 55 may be provided automatically without any direct user input.

The tactile indication 55 may comprise any output which may be sensed by the user using touch. The tactile indication may be provided by the user output device 16.

As described above the tactile indication 55 may comprise a physical deformation of the apparatus 1 such as a folding of a corner or edge portion of the apparatus. In such embodiments of the invention, the tactile indication 55 which is provided replicates a folded corner of a page in a real book.

In other embodiments of the invention the tactile indication 55 may comprise an electrical current which may be felt by the user of the apparatus 1 or the provision of an indentation or projection as described above.

The tactile indication 55 may be provided whenever the designated item satisfies the predetermined context. For example, if the predetermined context is that a real world item such as a location is within a certain proximity then the tactile indication 55 may be provided as the user comes closer to the location and then removed as the user moves away from the location. In such embodiments of the invention the designated item may remain designated even if the predetermined context is no longer satisfied.

In other embodiments of the invention the tactile indication 55 may be provided until it is removed by the user of the apparatus 1. The user may use the user input device 17 to remove the tactile indication 55. For example, if the designated item comprises information which is designated as important the tactile indication 55 may still be provided, even after the designated item is not displayed on the display 15 anymore. This may provide a reminder to the user of the apparatus 1 about the designated item.

In embodiments of the invention where the designated item comprises a real world item the proximity of the apparatus 1 to the real world item may be indicated by the type of tactile indication 55 provided. For example, the amount of folding or bending of the apparatus 1 or the angle at which the apparatus 1 has been bent may increase the closer the apparatus 1 is to the real world item. In some embodiments of the invention, where the real world item comprises a location such as a shop, a first tactile indication 55 comprising bending or folding approximately 5 mm of the edge of the apparatus 1 may be provided if the user is within 100 m of the shop. A second tactile indication 55 comprising bending or folding approximately 10 mm of the edge of the apparatus 1 may be provided if the user is within 50 m of the shop.

FIG. 3C illustrates a method of displaying a designated item according to embodiments of the invention. The method of FIG. 3C may be carried out by the same apparatus 1 as the method described above in relation to FIGS. 3A and 3B.

Alternatively in other embodiments of the invention the methods may be carried out by two different apparatus. For example a user might first access the item of information on a first apparatus such as a personal computer or tablet device and may designate the item using this apparatus. The user may then later access the same information using a different apparatus 1 such as a mobile telephone. In such embodiments of the invention the same user may be associated with different apparatus 1. In other embodiments of the invention the first method may be carried out by a first user using a first apparatus and the second method may be carried out by a second, different user using a second, different apparatus. For example the users may be sending messages via communications links or accessing services such as social networking services or web pages.

At block 41 (see FIG. 3C) the controller 4 detects that the designated item is displayed on the display 15. The designated item may have been designated using the method described above.

In response to the detection of that the designated item is displayed on the display 15 the controller 4 controls the user output device 16, at block 43 (see FIG. 3C), to provide a tactile indication 55 to the user of the apparatus 1. The tactile indication 55 may be provided automatically without any direct user input.

As described above, the tactile indication 55 may comprise any output which may be sensed by the user using touch. The tactile indication may be provided by the user output device 16.

The tactile indication 55 may be provided whenever the designated information is displayed on the display 15. The tactile indication 55 may be provided simultaneously with the display of the information.

In some embodiments of the invention the tactile indication 55 may be removed when the information is no longer displayed on the display 15. The controller 4 may be configured to detect when the designated item is removed from the display 15 and control the user output device 16 to stop providing the tactile indication 55.

In other embodiments of the invention the tactile indication 55 may still be provided even after the designated item is no longer displayed on the display 15. This may provide a reminder to the user about the designated item without requiring the designated item to be displayed on the display 15 for a long period of time.

Embodiments of the invention provide the advantage that the tactile indication 55 enables a user to easily determine that a designated item satisfies a predetermined criteria. For example, in some embodiments of the invention it enables a user to easily determine that a designated item is displayed on the display 15. For example if a user is browsing the internet or scrolling through a document such as an electronic book they can easily determine when the designated item is displayed because they will feel the tactile indication 55. This may make it easier for a user to find the designated item. This may also mean that the user does not have to look at the display 15 or concentrate very hard on the display 15 when looking for the designated item as they can feel the tactile indication 55 through their skin.

Some embodiments of the invention may also provide the further advantage that they replicate or mimic the action of designating a page in a book by folding a corner of the page. For example, as described above a corner or edge portion of the apparatus 1 may be folded. This provides the advantage that it makes the apparatus 1 more intuitive for a user to use as it replicates an action they would make with real world objects and so would be familiar to a user.

In some embodiments of the invention different tactile indications 55 may be provided. For example, where the tactile indication 55 comprises the deformation of a portion of the apparatus 1 different sized and/or shaped deformations may be provided.

The tactile indication 55 which is provided may be dependent upon a property of the designated item. For example a user may be able to designate items with different levels of importance. The tactile indication 55 which is provided may be dependent upon the level of importance of the item. In other embodiments of the invention the variable property of the designated item may be the number of users or the identity of other users who have designated an item. For example where the item is a web page which is accessible to other users a more prominent tactile indication may be provided if a large number of users have designated the item than if a smaller number of users.

As mentioned above, different levels of importance may be assigned to different items. The different importance levels may be indicated by the type of tactile indication 55 provided, for example, the amount of folding or bending of the apparatus 1 or the angle at which the apparatus 1 has been bent. For example, a first level of importance may be indicated by bending or folding approximately 5 mm of the edge of the apparatus 1. A second, higher level of importance may be indicating by folding more than 5 mm of the edge of the apparatus, for example approximately 10 mm.

Figure 4A:
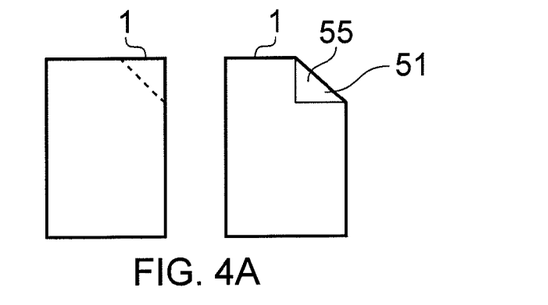
FIGS. 4A to 4D schematically illustrate exemplary tactile indications which may be provided in embodiments of the invention.
Figure 4B:
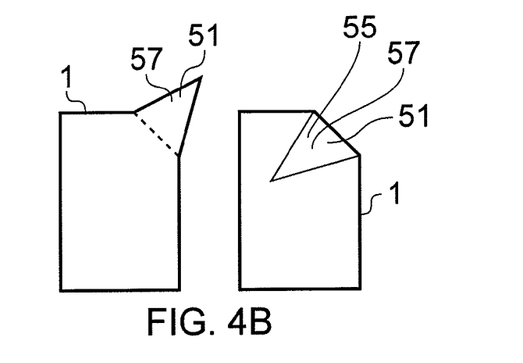

FIGS. 4A to 4B illustrate different examples of tactile indication which may be provided in various embodiments of the invention.

In FIGS. 4A to 4B the apparatus 1 is substantially rectangular and comprises four corners. It is to be appreciated that in other embodiments of the invention the apparatus 1 may be a different shape.

In FIG. 4A the tactile indication 55 which is provided comprises the folding of the top right hand corner 51 of the apparatus 1. This tactile indication 55 replicates the action of folding a page in a real book. This provides both a visual and tactile indication 55 to a user that a designated item is displayed on the display 15.

In FIG. 4B the tactile indication 55 which is provided comprises both the folding of the top right hand corner 51 of the apparatus 1 and the deformation of the top right hand corner 51 so that this corner also changes shape. In the particular embodiment illustrated in FIG. 4B the corner 51 changes shape so that it comprises an elongated portion 57 and an acute angle rather than a right angle. The tactile indication 55 may be used to indicate, not only that a designated item is displayed on the display 15, but also a variable property of the designated item. For example it may indicate that the item is designated as high importance or that a large number of other users have also designated the item.

Figure 4C:
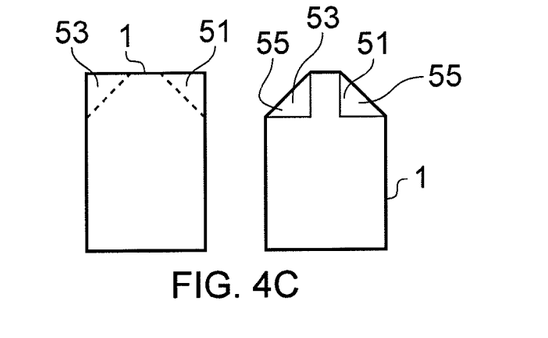

In FIG. 4C the tactile indication 55 which is provided comprises the folding of the top right hand corner 51 and the top left hand corner 53 of the apparatus 1. That is, in the embodiment illustrated in FIG. 4C more than one tactile indication 55 is provided simultaneously. The plurality of tactile indications 55 may be used, for example, to indicate that a plurality of users have designated this item. It is to be appreciated that any number of tactile indications 55 may be provided in various embodiments of the invention.

Figure 4D:
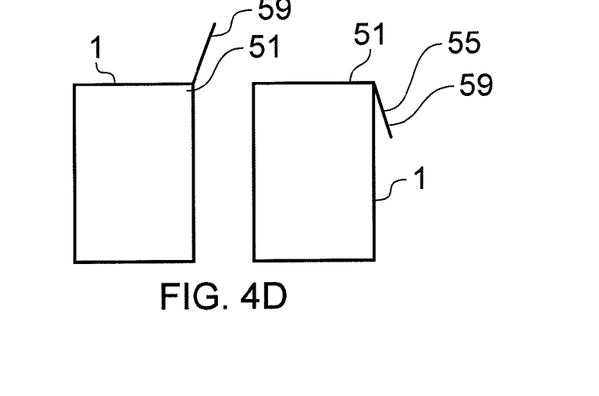

In FIG. 4D the tactile indication comprises the moving of a portion 59 of the apparatus 1 which extends outwards from the body of the apparatus 1. The portion 59 may comprise for example, an antenna. In the exemplary embodiment the portion 59 may be moved between a first position and a second position. It is to be appreciated that different positions may be used to indicate different properties of the designated item.

The blocks illustrated in FIGS. 3A and 3C may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example, in some embodiments of the invention the tactile indication 55 may be provided whenever the apparatus 1 receives a designated item. Where the item has been designated, the tactile indication 55 may be provided when the designated item is received. In such embodiments of the invention the item may have been designated by the sender of the information.

In some embodiments of the invention the designated item may comprise a notification, such as a status update or message, in a social networking application. In such embodiments of the invention the tactile indication 55 may be provided whenever a new notification is received. In some embodiments of the invention, once the tactile indication is provided, the user may be able to make a user input to access the notification. For example, in some embodiments of the invention the tactile indication 55 which is provided in response to the detection of a new status update from a social network may comprise the folding of a corner of the apparatus. In such embodiments of the invention the user may be able to make a user input comprising a further deformation of the apparatus 1 and in response to this user input the controller may access the social networking application to enable the notifications to be viewed.

In some embodiments of the invention the item may comprise a graphical user interface item indicative of a piece of information. For example a user may designate information such as a voicemail or other audio content which has been received as high importance. In which case the designated item which is displayed on the display 15 may comprise an image or icon indicative of the voicemail or other audio content. In other embodiments of the invention the item may comprise a graphical user interface item indicative of a real world object such as a location or a person. This may enable a user to easily locate places or nearby contacts in a map application, for example.

In some embodiments of the invention it might not be necessary for the whole of the designated item to be displayed on the display 15 in order for the tactile indication to be provided. For example where the designated item is too large to be displayed on the display all at the same time the tactile indication may be provided whenever any portion of the designated item is displayed. In other embodiments of the invention the tactile indication may be provided if the designated item is displayed in a preview mode. For example, the designated item may be an entry in a list such as a list of received messages or contact entries. In such embodiments of the invention the tactile indication may be provided whenever the item is displayed in the list.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   detecting that a designated item satisfies a predetermined context; and
   providing tactile indication that the designated item satisfies the predetermined context;
   wherein the tactile indication that the designated item satisfies the predetermined context comprises a physical deformation of a flexible body portion of the apparatus; and
   wherein at least one of different sized and shaped deformations are provided in dependence upon a property of the designated item which satisfies the predetermined context.

2. A method as claimed in claim 1 wherein the predetermined context comprises at least one of displaying the designated item on a display, or the designated item being within a predetermined distance of a user.

3. A method as claimed in claim 1 wherein the tactile indication comprises at least one of the physical deformation of a portion of an apparatus, or folding a portion of the apparatus.

4. A method as claimed in claim 1 wherein the designated item is designated in response to a user physically deforming at least a portion of the apparatus.

5. A method as claimed in claim 1 wherein the designated item is designated in response to a user folding a portion of the apparatus.

6. A method as claimed in claim 1 wherein the designated item comprises at least one of an item associated with a function of the apparatus, an item from a service to which the user of the apparatus subscribes, or a real world item.

7. A method as claimed in claim 6 wherein the designated item is designated by one or more other users of the service.

8. A method as claimed in claim 1 wherein the designated item is designated by the user of the apparatus.

9. A method as claimed in claim 1 wherein the properties of the designated item comprises at least one of a level of importance assigned to the item or the number of different users which have designated the item.

10. A method as claimed in claim 1 further comprising detecting that the designated item no longer satisfies the predetermined context and removing the tactile indication.

11. A method as claimed in claim 1 wherein the tactile indication is provided automatically whenever the designated item satisfies the predetermined context.

12. A method as claimed in claim 1, comprising enabling designation of multiple items by a user wherein the method of claim 1 is enabled in respect of each of the multiple designated items.

13. An apparatus comprising:
   at least one processor; and
   at least one memory including computer program code;
   wherein the at least one memory and the computer program code are configured to, with the at least one processor, enable the apparatus to:
   detect that a designated item satisfies a predetermined context; and
   provide tactile indication that the designated item satisfies the predetermined context;
   wherein the tactile indication that the designated item satisfies the predetermined context comprises a physical deformation of a flexible body portion of the apparatus; and
   wherein at least one of different sized and shaped deformations are provided in dependence upon a property of the designated item which satisfies the predetermined context.

14. An apparatus as claimed in claim 13 wherein the predetermined context comprises at least one of displaying the designated item on a display, or the designated item being within a predetermined distance of the apparatus.

15. An apparatus as claimed in claim 13 wherein the tactile indication comprises at least one of physical deformation of a portion of the apparatus, or folding a portion of the apparatus.

16. An apparatus as claimed in claim 13 wherein the designated item is designated in response to a user physically deforming at least a portion of the apparatus.

17. An apparatus as claimed in claim 13 wherein the designated item is designated in response to a user folding a portion of the apparatus.

18. An apparatus as claimed in claim 13 wherein the designated item comprises at least one of an item associated with a function of the apparatus, an item from a service to which the user of the apparatus subscribes, or a real world item.

19. A physical entity embodying a computer program comprising computer program instructions that, when executed by at least one processor, enable an apparatus at least to perform:
   detecting that a designated item satisfies a predetermined context; and
   providing tactile indication that the designated item satisfies the predetermined context;
   wherein the tactile indication that the designated item satisfies the predetermined context comprises a physical deformation of a flexible body portion of the apparatus; and
   wherein at least one of different sized and shaped deformations are provided in dependence upon a property of the designated item which satisfies the predetermined context.

20. A physical entity embodying a computer program as claimed in claim 19 wherein the predetermined context comprises at least one of displaying the designated item on a display, or the designated item being within a predetermined distance of a user.

* * * * *